Patented Nov. 10, 1925.

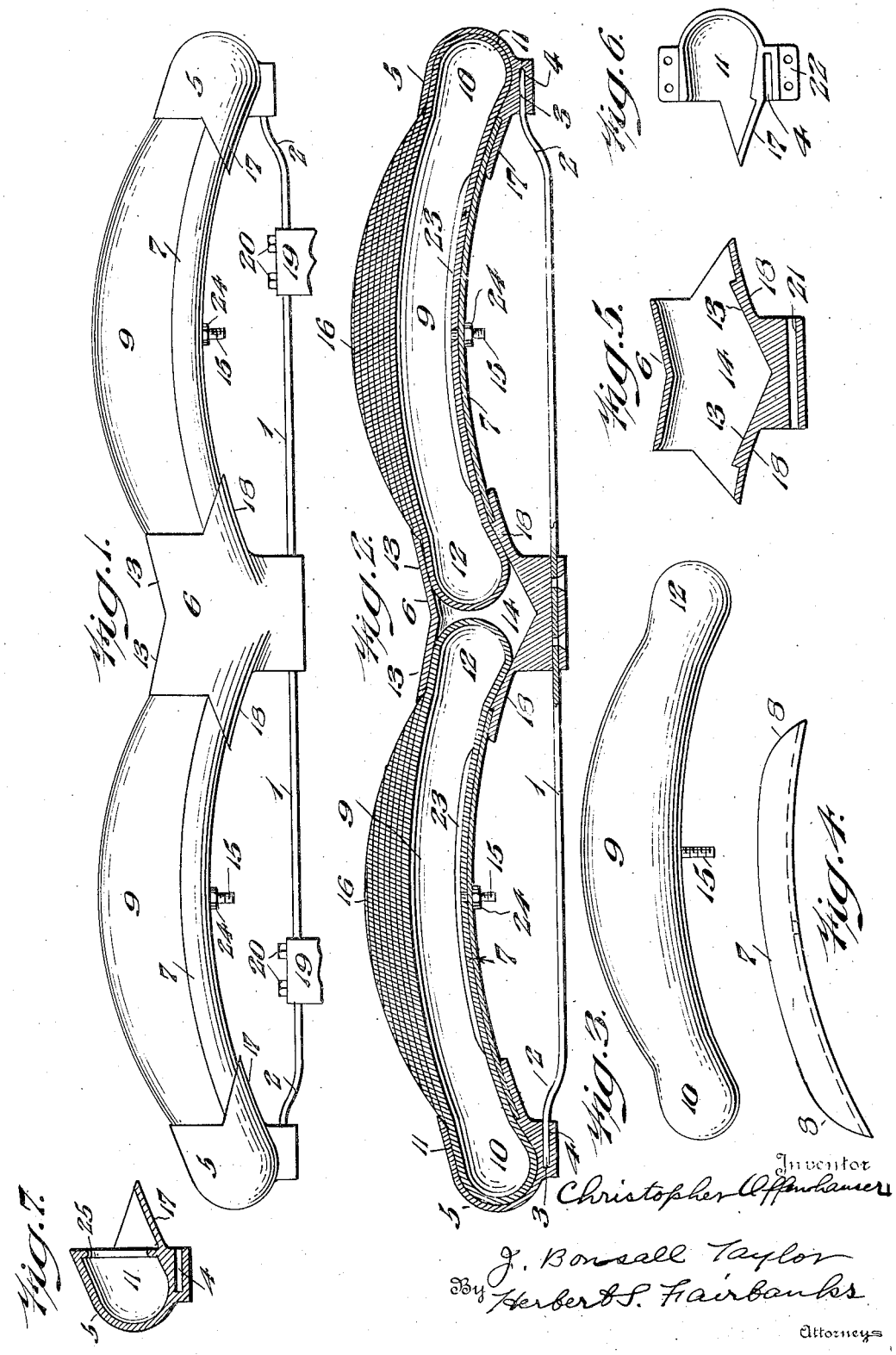

1,561,184

UNITED STATES PATENT OFFICE.

CHRISTOPHER OFFENHAUSER, OF PHILADELPHIA, PENNSYLVANIA.

AUTOMOBILE BUMPER.

Application filed February 7, 1925. Serial No. 7,716.

*To all whom it may concern:*

Be it known that I, CHRISTOPHER OFFENHAUSER, a citizen of the United States, residing at Philadelphia, county of Philadelphia, State of Pennsylvania, have invented a new and useful Automobile Bumper, of which the following is a specification.

The object of my present invention is to devise a novel construction and arrangement of an automobile bumper which is adapted to be connected with either the front or rear portions of a motor vehicle, and wherein the contact portions of the bumper are formed by resilient and preferably inflatable members.

With the above and other objects in view, which will hereinafter appear, my present invention comprehends a novel construction and arrangement of an automobile bumper wherein I employ a plurality of inflatable members which form the contact portions of the bumper.

It further comprehends a novel bumper wherein a plurality of inflatable contact members are employed having a spring support and having their ends extending into caps or holders in which they are retained and with which they interlock when the contact members are inflated.

It further comprehends a novel construction of a bumper wherein a central holder and end holders are carried by a spring bar which is adapted to be attached to the motor vehicle, said holder having assembled therewith spring members, which, with the central and end holders, serve to support inflatable tubes.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and that the invention is not limited to the precise arrangement and organization of these instrumentalities as herein set forth.

Figure 1 represents a top plan view of an automobile bumper embodying my invention.

Figure 2 represents a sectional plan view thereof.

Figure 3 represents a top plan view of one of the inflatable members.

Figure 4 represents a side elevation of the spring support for an inflatable member.

Figure 5 represents a sectional view of the central support or cap.

Figure 6 represents in side elevation another embodiment of my invention showing the end caps as being made in section.

Figure 7 represents a sectional view of another embodiment of end holder.

Similar numerals of reference indicate corresponding parts.

Referring to the drawings:

1 designates a bar of spring metal, the body portion of which is substantially in a straight line, and, at its free ends, the bar is curved inwardly and outwardly as at 2, and its terminal portions 3 extend into sockets 4 carried by the end caps or holders 5. The terminals 3 are fixedly secured to the end holders in any desired manner, for example, by spot welding. The bar 1 at its central portion is secured to a central cap or holder 6 in such a manner that it is fixedly connected therewith, for example, by electrically welding together the juxtaposed portions of the bar and holder 6.

The end holders and the central holders are connected together by means of the spring members 7. A plurality of spring members are employed, and each consists of a strip of spring steel which is curved in the direction of its length and also traversely, and the free ends are tapered as at 8. One end of a spring member 7 is fixed to its respective end holder 5, for example, by riveting or electrically welding such parts together, and the inner ends of the spring members 7 are fixed to the central support 6, for example, by riveting or electrically welding them together, so that the end holders and the central holder are connected by the bowed spring members 7 and also by the bar 1.

9 designates inflatable contact members which consist of longitudinal extending tubes of vulcanizable material such as for example, rubber or rubber compounds, and this tube can be reinforced with fabric or any other desired material. The contact members 9 have their outer ends as at 10 so constructed that they are expansible and contractible, so that when the tubes are inflated their outer ends will conform to the shape of the pockets 11 in the end holders and their inner ends 12 will conform to the shape of the pockets 13 in the central holders 6. These pockets 13 are formed in the bore 14, which, as will be understood by reference to Figures 2 and 5, extends through the holder 6 and is inclined outwardly from its central portion, so that, when the two contact members 9 are assembled, their inner ends may if desired contact with each other.

Each contact member 9 is provided with a valve 15 which extends through its respective spring member so that each contact member or penumatic cushion can be independently inflated or deflated, as may be desired.

The end portions 10 and 12 may, if desired, have a greater degree of inflatability than the central portion of the bumper contact members 9, for example, it may be formed of rubber or rubber compound without being reinforced, or without having the same degree of reinforcement as the contact portion of the bumper, so that it can be more easily inserted into and removed from holders with which it co-operates.

The outer or contact portion of a member 9 may also have applied to it an additional layer or thickness of resilient material 16, such as for example, vulcanizable rubber of a better or of a different grade than that from which the rest of such member is formed. Each end holder 5 is provided with an outwardly and laterally extending flange 17 which is curved in cross section and is offset to receive the end of a spring member 7, so that the inner face of such spring will form a uniform curve with the pocket 11 in an end holder.

In a similar manner, the central holder 7 is provided with the outwardly and laterally inclined flanges 18 which are curved in cross section and which are adapted to receive the inner ends of the contact members 9, and these flanges 18 are offset so that the spring members 7, when connected therewith, will have their inner faces forming uniform curves with the curvature of the bore 14 and the walls of the pockets 13.

19 designates brackets which are longitudinally adjustable on the spring bar 1, and which are secured thereto by means of fastening devices 20. These brackets 19 are adapted to be connected with the automobile in the usual and conventional manner.

In the assembling of the bumper, the spring bar 1 is fixed to the end and central supports so that they are secured in spaced relationship, and the spring members 7 are connected with the end holders and with the central holder. The contact portions of the bumper are formed of inflatable tubes reinforced to any desired extent, and, prior to inflation, the ends are inserted in the juxtaposed holders, and the tubes are then inflated so that such ends will expand and conform to the shape of the pockets in which they are seated.

The portions of the contact members 9 which bear against the inner faces of the spring member 7 may, if desired, be secured thereto by means of material of adhesive nature. It will be noted that the spring member 7, which forms a pneumatic cushion, will under abnormal thrust on the contact members react on the holders 5 and 6, and the stresses will be transmitted therefrom to the spring bar 1, so that a very resilient construction is provided.

It will be seen that if an end cap strikes an object the spring action will be such that there is little likelihood of the bumper being deformed.

In case one or more of the inflatable contact members become injured through accident, it will be apparent that the contact member can be removed and repaired at a minimum of expense.

The inner face of the contact portion of the contact members 9 may be coated or provided with a layer of non-vulcanizable material such as is well known in the art, so that the inflatable contact members if punctured will be self-healing.

The central holders 6 are preferably provided with an aperture 21 to receive the spring bar.

In some cases it may be desired to make the holders in sections and I have shown in Figure 6, the end holders as being formed of two sections having flanges 22 which are apertured to receive fastening devices, although in practice the central holder and end holder are preferably formed of integral castings.

In my present construction, I employ a plurality of bowed inflatable contact members which are resiliently supported, and these contact members can be inflated to any desired internal pressure so that in case of impact against an object they will automatically resume their original contour.

In a head-on collision, it will be apparent that the force of the impact is taken up by a plurality of pneumatic cushions.

The spring members which connect the end holders and central holders are of arch formation, both transversely and longitudinally, and the pneumatic cushions when in position are also of arch formation. The contact members which are carried by the spring members are preferably provided with a valve mechanism so that they can be inflated, but it is also within the scope of my invention to fill the tubes or casing with any desired material and I do not desire to limit my invention to the use of air, as a cellular cushioning core, or a core of a resilient nature may be employed if desired and in such cases the end construction of the tube will be such that they could be forced into the pockets in the holders.

I have shown the valve mechanism as provided with an additional plate 23 which contacts with the inner surface of the tube so that when the nut 24 of the valve mechanism is tightened the contact members will be fixed with respect to the spring members which support them.

If a light construction is desired, the spring member 7 may be dispensed with and the ends of the contact member which are of arch formation will be wholly supported by the holders with which they co-operate.

It will be noted that the pockets or chambers in the end and central holders at their inlet and in Figures 2, 5 and 6 are of less width than the chamber in rear thereof so that on inflation the ends of the tubes will be firmly gripped in the holders.

In the embodiment seen in Figure 7, I accomplish the same result by forming the inwardly extending annular rib 25.

It will be noted that the holders are arranged in substantially the same plane and due to the arch construction of the spring members and of the tubes or cushions, it will be apparent that in the great majority of cases the impact with an object will be taken up by one or more of the contact members 9.

It will now be apparent that I have devised a new and useful automobile bumper which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. An automobile bumper having its contact portion consisting of a plurality of inflated tubes, holders for said tubes, and a spring bar connected with said holders.

2. An automobile bumper, having its contact portion consisting of a plurality of pneumatic cushions, each of which has the general contour of a bow, spring members carrying said cushions and having holders to receive the ends of the cushions, and a bar of spring metal connected with said holders.

3. An automobile bumper, having resiliently supported end and central holders, and a plurality of resilient contact members, each of which at one end is retained within an end holder and which at its opposite ends is retained within a central holder.

4. An automobile bumper, comprising resiliently supported end and central holders, spring members, each of which is fixed at one end to an end holder and at its opposite end to a central holder, and resilient contact members seated on said spring members and each having one end retained within an end holder and its opposite end retained within a central holder.

5. An automobile bumper, having spaced end and central holders, a spring bar fixed to said holders, spring members, each of which is connected at one end to an end holder and at its opposite end to a central holder, and pneumatic cushions seated on said spring member and having their ends retained within an end holder and a central holder by the inflation of said pneumatic cushions.

6. An automobile bumper, comprising a longitudinal extending spring bar adapted to be connected to a motor vehicle, end and central holders fixed to said bars in spaced relationship, spring members having a curve formation in cross section and each having one end fixed to an end holder and the opposite end fixed to a central holder, said members having the general contour of a bow, and inflatable tubes having closed ends adapted to enter said holders when deflated.

7. An automobile bumper, comprising a longitudinal extending spring bar adapted to be connected to a motor vehicle, end and central holders fixed to said bars in spaced relationship, spring members having a curve formation in cross section and each having one end fixed to an end holder and the opposite end fixed to a central holder, said members having the general contour of a bow, and inflatable tubes having closed ends adapted to enter said holders when deflated, said tubes having a valve mechanism fixed to their respective spring members.

8. An automobile bumper comprising a spring bar, end and central holders having means to receive said spring bar and fixed to said bar in spaced relationship, spring members having a curve formation in cross section, and a curve formation longitudinally, one end of a spring member being fixed to an end holder and the other end thereof being fixed to a central holder, said holders each having a chamber opening through its wall and restricted at its inlet end, and pneumatic cushions having the form longitudinally of bows, with their ends adapted to enter said chambers and be retained therein when their cushions are inflated.

9. An automobile bumper having resiliently supported end holder and central holders in spaced relation therewith and provided with a bore therethrough contributing to form a plurality of pockets, each of said end holders having a pocket opening through its wall, spring members in the form of a bow each of which is fixed at one end to an end holder and at its opposite end to said central holder, and inflatable tubes secured to said spring member and having their ends adapted to enter into said pockets and fill such pockets upon inflation of the tubes, the inner ends of said tubes being adapted to contact with each other when subjected to stresses by the tubes contacting with an object.

. CHRISTOPHER OFFENHAUSER.